(12) United States Patent
Trapp et al.

(10) Patent No.: US 7,842,339 B2
(45) Date of Patent: Nov. 30, 2010

(54) METHOD OF MAKING A WIPE-RESISTANT ANTIREFLECTION COATING ON A BOROSILICATE GLASS BODY AND COATING SOLUTION FOR USE IN SAID METHOD

(75) Inventors: Denise Trapp, Mittereich (DE); Stephan Tratzky, Neustadt (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/847,433

(22) Filed: Aug. 30, 2007

(65) Prior Publication Data

US 2008/0057187 A1 Mar. 6, 2008

(30) Foreign Application Priority Data

Sep. 2, 2006 (DE) ............... 10 2006 041 469

(51) Int. Cl.
*B05D 5/06* (2006.01)
(52) U.S. Cl. ............... 427/169; 427/162; 427/163.1; 427/165; 106/287.34
(58) Field of Classification Search ............... 427/162, 427/163.1, 165, 169; 106/287.34
See application file for complete search history.

(56) References Cited

U.S. PATENT DOCUMENTS

| | | | |
|---|---|---|---|
| 2,601,123 A | 6/1952 | Moulton et al. | |
| 6,174,608 B1 * | 1/2001 | Bertocchi et al. | 428/426 |
| 6,918,957 B2 | 7/2005 | Kursawe et al. | |
| 6,998,177 B2 | 2/2006 | Krzyzak et al. | |
| 7,128,944 B2 | 10/2006 | Becker et al. | |
| 2001/0051213 A1 | 12/2001 | Schulz et al. | |
| 2002/0090519 A1 | 7/2002 | Kursawe et al. | |
| 2003/0170465 A1 | 9/2003 | Krzyzak et al. | |
| 2004/0028809 A1 | 2/2004 | Bein et al. | |
| 2004/0028918 A1 | 2/2004 | Becker | |
| 2004/0258929 A1 * | 12/2004 | Glaubitt et al. | 428/446 |

FOREIGN PATENT DOCUMENTS

| | | |
|---|---|---|
| DE | 100 51 724 | 5/2002 |
| DE | 100 51 725 | 5/2002 |
| DE | 100 52 075 | 5/2002 |
| DE | 101 46 687 | 6/2003 |
| EP | 0 897 898 | 2/1999 |
| EP | 1 167 313 | 1/2002 |
| EP | 1 342 702 | 9/2003 |
| JP | 2005-298237 | * 10/2005 |

* cited by examiner

*Primary Examiner*—Shamim Ahmed
*Assistant Examiner*—Mahmoud Dahimene
(74) *Attorney, Agent, or Firm*—Michael J. Striker

(57) ABSTRACT

In the method of making an adherent and wipe-resistant porous $SiO_2$-containing antireflection coating on a borosilicate glass body a coating solution containing from 1.0 to 6.0 wt. % of HCl, from 0.5 to 7.0 wt. % of a $SiO_2$ sol based on solids content, from 0.5 to 5.0 wt. % of water, and from 85 to 98 wt. % of at least one volatile water-soluble organic solvent, is used to form an antireflection coating on the glass body. A glass body, on which the foregoing coating can be provided with good adherence and wipe resistance properties, is made of borosilicate glass having a composition, in percent by weight based on oxide content, of $SiO_2$, 70 to 75; $B_2O_3$, 8 to 11; $Al_2O_3$, 5 to 9; alkali metal oxides, 7 to 12; and alkaline earth metal oxides, 0 to 10.

6 Claims, No Drawings

METHOD OF MAKING A WIPE-RESISTANT ANTIREFLECTION COATING ON A BOROSILICATE GLASS BODY AND COATING SOLUTION FOR USE IN SAID METHOD

CROSS-REFERENCE

German Patent Application DE 10 2006 041 469.1-45, filed Sep. 2, 2006 in Germany, describes substantially the same invention as described herein below and claimed in the claims appended herein below and provides the basis for a claim of priority for the instant invention under 35 U.S.C. 119(a)-(d). The disclosure in the foregoing German Patent Application DE 10 2006 041 469.1-45 is hereby incorporated herein by explicit reference thereto.

BACKGROUND OF THE INVENTION

1. The Field of the Invention

The subject matter of the present invention is a method of making an adherent and wipe-resistant porous $SiO_2$-containing antireflection coating on a borosilicate glass body and a coating solution that is suitable for making the wipe-resistant antireflection coating.

2. The Related Art

It is known that porous $SiO_2$ coatings have poor adherence on borosilicate glass bodies. That especially relates to coatings, which were made using a $SiO_2$ sol.

To improve the adherence it has already been suggested to add tetraethyl-orthosilicate, whose dissolution products bind the $SiO_2$ particles to each other and with the base (U.S. Pat. No. 2,601,123), to the sol. However this solution to the foregoing problem makes the manufacture complicated and comparatively expensive.

EP 0 897 898 discloses a method of using a purely aqueous coating solution, which contains the $SiO_2$ sol and a surfactant. This method necessarily requires pre-treatment of the substrate to be coated with acetone, ethanol and water, a strongly alkaline cleaning solution (1N NaOH) or a commercial cleaning bath is necessarily required in this method. Furthermore the cleaning action during the pre-treatment must be augmented or strengthened using ultrasonic waves if necessary. These cleaning steps (see example 1) make this process expensive.

EP 1 342 702 A1 and U.S. Pat. No. 6,998,177 B2 disclose a good method, in which an alcoholic nitric acid-stabilized suspension of a $SiO_2$ sol is used. The known poor adherence and wipe resistance of the $SiO_2$ particle coating that is formed are avoided because $H_3PO_4$ is added to the coating liquid. The adherence and wipe resistance of the antireflection coating produced in this way is of course very good, however it has been shown that coatings of this type age in the course of several weeks. Because of this aging it becomes apparent that the original deep blue antireflection coating is fading and becoming cloudy so that the desired high transmission of incident light and the wipe resistance deteriorate. This fading can be reversed or counteracted by washing with water. It can be avoided if the glass body provided with the antireflection coating is washed with water after its manufacture while still in the factory, so that the aging problem is eliminated in practice. However these washing steps add additional effort and expense to the method.

SUMMARY OF THE INVENTION

It is an object of the present invention to provide a coating method and a coating solution, which is easily handled like the above-described phosphorus-containing coating solution, but in which or with which the coating formed therewith has no aging problems and does not need to be washed after its manufacture.

According to the present invention this object is attained by a method in which a borosilicate glass body with a composition, in percent by weight based on oxide content, of $SiO_2$, 70 to 75; $B_2O_3$, 8 to 11; $Al_2O_3$, 5 to 9; alkali metal oxides, 7 to 12; and alkaline earth metal oxides, 0 to 10, is wet with a solution containing:

| | |
|---|---|
| HCl | 1.0 to 6.0 wt. % |
| $SiO_2$ Sol | 0.5 to 7.0 wt. % (solids content) |
| Water | 0.5 to 5.0 wt. % |
| Volatile water-soluble organic solvent | 85 to 98 wt. %. |

The HCl content acts as an acid to stabilize the $SiO_2$ sol in a known manner. The $SiO_2$ sol (Kiesel sol) can be made according to known methods, e.g. by treating an aqueous alkali silicate solution with an ion exchanger. Kiesel sol is an aqueous solution of colloidal amorphous $SiO_2$. The Kiesel sol obtained commercially usually contains from 30 to 60 wt. % $SiO_2$. The average particle diameter is from 5 to 150 nm.

The $SiO_2$ content in the coating solution is preferably from 0.5 to 2.5 or about 2.5 wt. %. The particle size of the $SiO_2$ in the coating solution should amount to from 5 to 50 nm, preferably from 8 to 20 nm.

The water content in the coating solution amounts to from 0.5 to 5.0 or about 5 wt. %. It usually comes from Kiesel sol, acid and the not always water-free solvent.

The remainder of the coating solution comprises a volatile, water-soluble organic solvent. The term "volatile" means that the solvent has a boiling point of 75 to 140° C., especially 75 to 85° C. Polar solvents are especially suitable as the water-soluble solvent. Monovalent lower alcohols with 1 to 5 carbon atoms, such as methanol, ethanol, propanols (e.g. n-propanol, isopropanol), butanols (e.g. n-butanol), and pentanols, are especially suitable. Furthermore water-soluble ketones with 3 to 5 C-atoms are suitable, especially acetone, methyl-ethyl-ketone, and diethylketone. Methanol, ethanol, propanol, butanol, dimethyl-ketone or mixtures thereof are especially preferred as the solvent.

The solution is usually made so that the entire amount of the solvent or only a part of the solvent is present at first, then the acid is added with stirring to the solvent that is present to form a mixture, and after that the silica sol is added to the mixture with stirring and then the remainder of the solvent is added if necessary to form the solution.

The wetting of the glass body with the coating solution can take place in any arbitrary manner, e.g. by rolling on with a porous roller (sponge roller), by paintbrush, by brush, flooding, etc., but preferably by spraying and especially preferably by dipping. During the dipping the glass body to be coated is immersed in the bath liquid with an arbitrary speed (with the only conditions being that the bath liquid is not sprayed or splattered and that no gas bubbles adhere to the immersed glass body) and drawn out again with constant speed. Suitable speeds are 1 mm·s$^{-1}$ up to about 100 mm·s$^{-1}$. The method should operate with the highest possible drawing speed in order to achieve a high production rate. The drawing speed depends on the evaporation rate of the solution and the viscosity of the solution, the apparatus conditions, the temperature of the solution and the atmosphere in the drawing region. One skilled in the art can easily optimize the dipping step with regard to the local conditions. Drawing speeds of from 1 to 20 mm·s⁻¹ have proven reliable in practice.

After wetting the glass body with the solution the coating that is formed is dried and burned-in in a known manner. The drawing can occur in a single step with the burning-in process, if it is certain that no gas bubbles occur during evaporation of the solution. The burning-in usually occurs in a manner that is known to those skilled in the art at temperatures of about 450° C. (i.e. under Tg) up to 35° C. above the transformation temperature Tg of the glass, especially in a temperature range from 575° C. to 590° C. However burning-in temperatures above Tg of the glass were still not used up to now.

The time required for burning-in depends on the conditions in the apparatus and can be easily determined by one skilled in the art. Usually about 0.5 to 1 hour is used for burning in the coating.

The coating produced comprises at least 95 wt. %, preferably at least 99 wt. %, $SiO_2$. It is especially preferred when the coating consists entirely of $SiO_2$ (i.e. 100% $SiO_2$).

The coating has a porosity of about 10 to 60 wt. % of the coating volume. With the porosity in this range a satisfactory antireflection coating, i.e. with a good transmission of light through the coated glass body, is obtained.

The coating thickness of the coating produced by the method of the invention, which is sufficient for good antireflection action, is between 50 nm and 500 nm. If this coating thickness is not attained, an additional coating step is required, preferably prior to the burning in of the original coating. However the previously applied coating must be allowed to dry prior to the subsequent second coating process so that it is not dissolved in the second coating process. A coating thickness between 80 and 160 nm is preferred.

The pore diameter of the coating made in this way should amount to preferably from 2 to 50 nm, since an especially good antireflection action is achieved with this pore size.

Especially the method allows the making of an antireflection coating on a borosilicate glass, which has a composition, in wt. % based on oxide content, of:

| | |
|---|---|
| $SiO_2$ | 70-75 |
| $B_2O_3$ | 8-11 |
| $Na_2O + K_2O$ | 7-12 |
| $Al_2O_3$ | 5-9 |
| Alkaline earth metal oxides | 0-10. |

The adherence and wipe-fastness of the coating is definitely less on borosilicate glass that has a composition that varies or deviates from the aforesaid composition.

Borosilicate glass with the following composition, in wt. % based on oxide content, of:

| | |
|---|---|
| $SiO_2$ | 70-75 |
| $B_2O_3$ | 8-11 |
| $Al_2O_3$ | 6-8 |
| $Na_2O$ | 6-8 |
| $K_2O$ | 1-4 |
| Σ Alkali metal oxides | 7-12, |
| CaO | 0-2, | is especially suitable as a substrate for the coating of the present invention.

A special cleaning step prior to wetting, e.g. by spray coating or dipping the glass body into the coating solution, is normally not required. The dirt must be removed from the glass body by a washing process only if the glass body becomes dirty during transport or storage.

The coating is especially suitable for coating borosilicate glass bodies of the above-described compositions formed as glass tubes, glass rods or glass disks, for making a solar energy apparatus, especially for industrial service water heating, process heating and especially for parabolic trough solar energy engineering.

An antireflection coating may be produced on borosilicate glass with the method according to the invention, which resists aging without an after-treatment and provides an outstanding wipe resistance.

EXAMPLES

1. Methods of Making the Coating Solutions of the Prior Art and of the Invention A) Prior Art Phosphate-containing Coating Solution
A phosphate-containing coating solution was made in a manner analogous to the method of example 1 of U.S. Pat. No. 6,998,177 B2, as described in the following paragraph.
235.8 g of isopropanol were mixed with 206.0 g 1N $HNO_3$ and the resulting mixture was stirred for ten minutes. Then 44.5 g of 85% $H_3PO_4$ were added to the mixture and it was stirred again for five minutes. After that 271.2 g of Kiesel sol (Koestrosol 0830A, 30% $SiO_2$, Bad Koestriz Chemical Works) were added to the mixture and then it was stirred for an additional five minutes. The resulting mixture was then diluted with 3301 g isopropanol and then allowed to stand for a day. After that this solution was ready for use.

B) Prior Art Phosphate-Free Coating Solution
A phosphate-free coating solution was made in a manner analogous to the method of example 2 of U.S. Pat. No. 6,998,177 B2, as described in the following paragraph.
A coating solution was prepared according to the above-described recipe A, but with the following changes: 268.8 g of Kiesel sol were used and no phosphoric acid was added to the mixture.

C) According to the Invention
A coating solution was prepared according to the invention, as described in the following paragraph.
235.8 g of isopropanol were mixed with 216 g of 5N HCl and the resulting solution was stirred for one minute. After that 268.8 g of Kiesel sol (Koestrosol 0830A) were added to the solution and the resulting mixture was stirred for one minute. The resulting mixture was mixed with 3301 g of isopropanol and stirred for five minutes. After that the solution was ready for use.

2. The Coating Method

A glass tube to be coated with an outer diameter of 125 mm, a wall thickness of 3 mm, and a length of 500 mm was provided. The glass tube had a composition, on the basis of oxide content, of 73 wt. % of $SiO_2$, 9.5 wt. % of $B_2O_3$, 7 wt. % of $Al_2O_3$, 7 wt. % of $Na_2O$, 3 wt. % of $K_2O$, and 0.5 wt. % of CaO (Glass No. 1). The glass tube was immersed or dipped in the coating solution along 250 mm of its length. The dipping speed was 10 mm·s⁻¹. After an immersion time of about 10 sec the glass tube was withdrawn from the coating solution at a speed of 3.8 mm·s⁻¹. A moist film was formed on the glass by the drawing process. The coated glass was either heat treated in a heated chamber at a temperature of 575° C., i.e. 10° C. above Tg of the glass, for one hour or heat treated at a temperature of 500° C., i.e. 65° C. above Tg of the glass, for one hour.

For comparison a glass tube made of borosilicate glass with a composition, in wt. % on the basis of oxide content, of $SiO_2$, 81; $B_2O_3$, 13; $Al_2O_3$, 2; $Na_2O$, 3.5; and $K_2O$, 0.5, was also coated (Glass No. 2). The glass tube had an outer diameter of 100 mm and a wall thickness of 2.5 mm.

3. Resistance to Aging

The coated glass tubes were stored in free air for a period of 9 months. Whether the coated glass tubes had any observable cloudiness or fading of the color of their antireflection coating was tested.

4. Wipe Test

Since the wipe test according to DIN 58196 5 is only suitable for planar glass samples, the test was changed for testing the coated tubes.

A standard eraser with the specification MIL-E-12397 was used as the wiping body. The glass tube was clamped in place and the eraser was moved back and forth along the tube axial direction over the coating with a 1 kg force on a bearing surface of the glass tube by means of a moving carriage. The number of wiping strokes required for the complete removal of the coating is a measure of the wipe resistance of the coating. The wipe test was performed immediately after the burning in of the coating ("initially after burning in") and was repeated again after some time.

5. Results

The results of the tests of the coated glass tubes described in the foregoing description of the examples are collected and reported in Table I.

TABLE I

WIPE RESISTANCE AND AGING RESISTANCE OF THE COATING ACCORDING TO THE INVENTION AND COMPARATIVE COATINGS OF THE PRIOR ART

| Example | Glass No. | Burning-in Temperature, ° C. | Aging Resistance | Wipe Test [No. Strokes] |
| --- | --- | --- | --- | --- |
| Ex. 1 with Phosphate Solution A (Prior Art) | 1 | 500 | Strong fading after 3 weeks, (almost colorless) | Initially >50, after 3 months aging >50 |
| Ex. 1 with Phosphate Solution A (Prior Art) | 1 | 575 | Strong fading after 3 weeks, stronger than at a burning in temperature of 500° C. | Initially >50, after 3 months aging >50 |
| Ex. 2 with Phosphate-free Solution B (Prior Art) | 1 | 500 | Strong fading after 3 weeks, point-like cloudiness after 3 weeks, heavy cloudiness after 3 months | Initially 36, after 3 weeks aging 2 |
| Ex. 2 with Phosphate-free Solution B (Prior Art) | 1 | 575 | Strong fading after 3 weeks, stronger cloudiness after 3 weeks | Initially 36, after 3 weeks aging 2 |
| Ex. 3 Solution C (Invention) | 1 | 500 | Scarcely any fading or cloudiness | Initially >50, after 9 months aging >50 |
| Ex. 3 Solution C (Invention) | 1 | 575 | Scarcely any fading or cloudiness | Initially >50, after 9 months aging >50 |
| Ex. 4 Solution A | 2 | 500 | no fading, but crystal-like efflorescence, recurring after washing | Initially 50, after 10 days aging 10 |
| Ex. 5 Solution C | 2 |  | Same as in ex. 4 | Initially >50, After 10 days aging 15 |

The advantage of the method according to the invention is clear from the foregoing examples.

While the invention has been illustrated and described as embodied in a method of making a wipe-resistant antireflection coating on a borosilicate glass body and a coating solution for use in the method, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various uses without omitting features that, from the standpoint of prior art, fairly constitute essential characteristics of the generic or specific aspects of this invention.

What is claimed is new and is set forth in the following appended claims.

We claim:

1. A method of making adherent and wipe-resistant porous $SiO_2$-containing antireflection coatings on borosilicate glass bodies, said method comprising the steps of:

a) providing a borosilicate glass body to be coated, said borosilicate glass body with a composition, in percent by weight based on oxide content, consisting of $SiO_2$, 70 to 75; $B_2O_3$, 8 to 11; $Al_2O_3$, 5 to 9; alkali metal oxides, 7 to 12; and alkaline earth metal oxides, 0 to 10;

b) wetting said borosilicate glass body to be coated with a coating solution consisting of from 1.0 to 6.0 wt. % of HCl, from 0.5 to 7.0 wt. % of a $SiO_2$ sol based on solids content, from 0.5 to 5.0 wt. % of water, and from 85 to 98 wt. % of at least one volatile water-soluble organic solvent, to form an antireflection coating on the borosilicate glass body; and then c) drying and burning in the antireflection coating formed on the borosilicate glass body in step b) at a temperature of about 450° C. to 35° C. above a glass transformation temperature Tg of the glass body.

2. The method as defined in claim 1, in which said at least one volatile water-soluble organic solvent is selected from the group consisting of methanol, ethanol, propanols, butanols, dimethylketone and methylethylketone.

3. The method as defined in claim 1, in which the wetting of the glass body to be coated occurs by dipping the glass body to be coated in the coating solution.

4. The method as defined in claim 3, further comprising removing the glass body from the coating solution with a withdrawal speed between 1 mm·s$^{-1}$ and 100 mm·s$^{-1}$.

5. The method as defined in claim 4, wherein said withdrawal speed is between 1 mm·s$^{-1}$ and 20 mm·s$^{-1}$.

6. The method as defined in claim 1, wherein said borosilicate glass body with a composition consisting of from 70 to 75 wt. % of said $SiO_2$, from 8 to 11 wt. % of said $B_2O_3$; from 6 to 8 wt. % of said $Al_2O_3$; from 6 to 8 wt. % of $Na_2O$; from 1 to 4 wt. % of $K_2O$; and from 0 to 2 wt. % of CaO.

\* \* \* \* \*